United States Patent [19]

Kita et al.

[11] Patent Number: 4,593,132

[45] Date of Patent: Jun. 3, 1986

[54] PROCESS FOR PRODUCING A GRAPHITE FLUORIDE

[75] Inventors: Yasushi Kita; Hishaji Nakano; Shiro Moroi; Akira Sakanoue, all of Ube, Japan

[73] Assignee: Central Glass Co., Ltd., Yamaguchi, Japan

[21] Appl. No.: 659,049

[22] Filed: Dec. 10, 1984

Related U.S. Application Data

[63] Continuation of Ser. No. 388,633, Jun. 15, 1982, abandoned.

[30] Foreign Application Priority Data

Jul. 22, 1981 [JP] Japan .................. 56-114849

[51] Int. Cl.$^4$ .............................. C07C 17/00
[52] U.S. Cl. .................................... 570/150
[58] Field of Search ......................... 570/150

[56] References Cited

U.S. PATENT DOCUMENTS

| | | | |
|---|---|---|---|
| 2,770,660 | 11/1956 | Passino et al. | 570/150 |
| 3,925,492 | 12/1975 | Ukaji et al. | 570/150 |
| 3,929,918 | 12/1975 | Meshri et al. | 570/150 |
| 3,929,920 | 12/1975 | Komo et al. | 570/150 |
| 4,243,615 | 1/1981 | Watanabe et al. | 570/150 |
| 4,423,261 | 12/1983 | Watanabe et al. | 570/150 |

OTHER PUBLICATIONS

Kita et al., Chemical Composition and Crystal Structure of Graphite Fluoride, JACS, 101:14, pp. 3832–3841 (Jul. 4, 1979).

Primary Examiner—Charles F. Warren
Assistant Examiner—Joseph A. Boska
Attorney, Agent, or Firm—Armstrong, Nikaido, Marmelstein & Kubovcik

[57] ABSTRACT

A graphite fluoride can be produced safely and in high yield on a commercial production scale by a process comprising reacting a carbon material having an average size of 100µ to 10 mm with fluorine. Further, when the fluorination reaction is stopped before completion thereof and the graphite fluoride product is subjected to sifting with a sieve to separate a desired graphite fluoride from the raw carbon material remaining unreacted.

7 Claims, 1 Drawing Figure

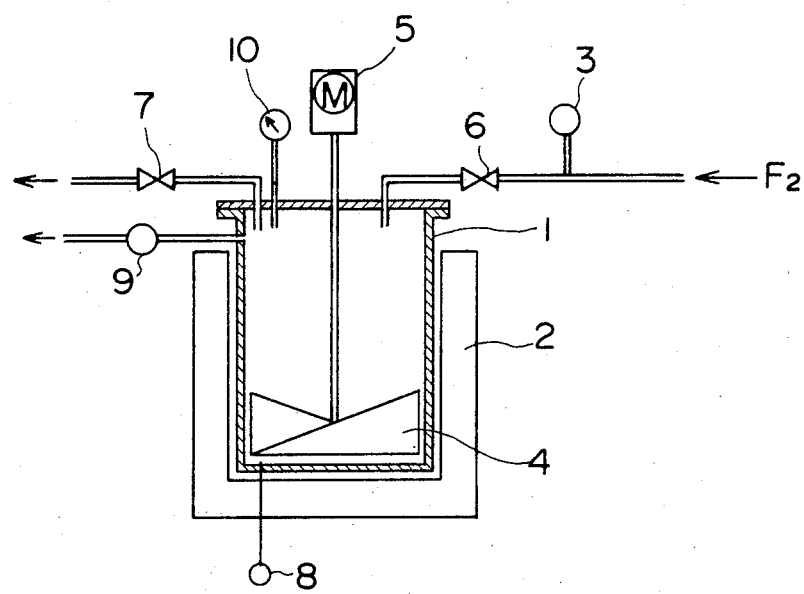

PROCESS FOR PRODUCING A GRAPHITE FLUORIDE

This is a continuation of application Ser. No. 388,633 filed June 15, 1982 abandoned.

This invention relates to a process for producing a graphite fluoride. More particularly, the present invention is concerned with a process for stably producing a graphite fluoride from a carbon material and fluorine safely and in high yield on an enlarged production scale while preventing a decomposition of the desired product or explosion in the reaction system which is likely to occur during the reaction.

Conventionally known graphite fluoride is poly-monocarbon monofluoride represented by the formula $(CF)_n$, which is highly appreciated, because of its peculiar properties, in a wide variety of industrial application fields. For example, $(CF)_n$ is useful as active materials in electrochemical cells, lubricants, anti-wetting, stain resistant and water and/or oil repellent materials, etc. Especially, in the field of electrochemical cells, $(CF)_n$ is known to be an active material capable of providing a primary cell of high energy density and long shelf life in which voltage drop due to discharge is scarcely observed for a long period of time as disclosed in U.S. Pat. No. 3,536,532 Specification. $(CF)_n$ can be produced by reacting an amorphous carbon material such as petroleum coke, with fluorine at a temperature of about 200° C. to about 450° C. or by reacting a crystalline carbon material, such as natural and artificial graphites, with fluorine at a temperature of about 500° C. to about 630° C. However, $(CF)_n$ has fatal drawbacks or disadvantages in the production thereof, since the thermal decomposition temperature of $(CF)_n$ is extremely close to the temperature employed for the formation of the $(CF)_n$ so that during the formation of $(CF)_n$, $(CF)_n$ formed is liable to decompose, resulting in an extremely low yield of $(CF)_n$.

Watanabe et al. found a novel graphite fluoride, namely, poly-dicarbon monofluoride represented by the formula $(C_2F)_n$ and a process for the production thereof. $(C_2F)_n$ can be produced in relatively high yield, and hence can be provided at comparatively low cost. The novel graphite fluoride $(C_2F)_n$ can be obtained, as described in detail in Japanese Patent Application Laid-Open Specification No. 102893/1978, U.S. Pat. No. 4,243,615 Specification and U.S. reissued Pat. No. Re. 30,667 Specification, by heating a graphite material at a temperature of 300° to 500° C. in an atmosphere of fluorine gas of 100 to 760 mmHg. As the graphite material to be used for the production of $(C_2F)_n$, there can be mentioned a natural graphite, an artificial graphite, a kish graphite, a pyrolytic graphite and mixtures thereof. The resulting $(C_2F)_n$ has a crystalline structure in which a layer structure is stacked with an interlayer spacing of about 9.0 Å (whereas the crystalline structure of $(CF)_n$ has an interlayer spacing of about 6 Å) to form a packing structure, and in each layer, alternate carbon atom is bonded to one fluorine atom, as different from $(CF)_n$ in which each carbon atom is bonded to one fluorine. Each of $(CF)_n$ and $(C_2F)_n$, however, has $CF_2$ and $CF_3$ groups as the peripheral groups at the terminals of the carbon hexagonal net work layer of the product. Therefore, when fluorination of a graphite has been completed, the F/C ratios of the resulting $(C_2F)_n$ and $(CF)_n$ exceed 0.5 and 1.0, respectively. The excess amount of fluorine due to the peripheral $CF_2$ and $CF_3$ groups increases as the crystallite size of the a,b-axis of a graphite fluoride crystal becomes small [see J. Amer. Chem. Soc., 101, 3832, (1979)].

As is seen from the above, according to the reaction conditions and the kind or crystallinity of the carbon material employed, there is obtained $(CF)_n$, $(C_2F)_n$ or a mixture thereof, occasionally together with a carbon material remaining unreacted which is present in the product when fluorination of the carbon material is stopped before no weight increase of the product is observed. Therefore, fluorination of a carbon material can be conveniently expressed by the following scheme (1):

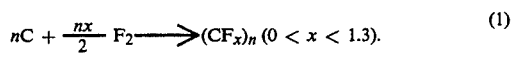
$$nC + \frac{nx}{2} F_2 \longrightarrow (CF_x)_n \quad (0 < x < 1.3). \tag{1}$$

According to reaction conditions, a graphite fluoride formed decomposes to cause side reactions of the following scheme (2):

$$(CF_x)_n \rightarrow C + CF_4, C_2F_6 \text{ etc.} \tag{2}$$

whereby the yield of $(CF_x)_n$ is lowered. Therefore, the main task for producing a graphite fluoride in high yield is to suppress the decomposition reactions.

A graphite fluoride is often prepared by simply introducing fluorine gas into a reactor in which a carbon material is placed and heating the system. This process, however, is unsuitable for the production of a graphite fluoride on a large scale because dissipation of the heat generated during the fluorination reaction is poor and the composition of the graphite fluoride formed becomes non-uniform. Therefore, there has been proposed a modified process in which a carbon material is reacted with fluorine while stirring or vibrating the carbon material by means of a rotary kiln or vibration-transporting apparatus. However, such a proposed process is inevitably accompanied by sudden decomposition with explosion (like dust explosion) caused by side reactions which occur during the fluorination reaction.

Conventionally, in the production of a graphite fluoride on an industrial scale, there is employed as a raw carbon material an amorphous or graphite material having a particle size of less than 100μ from a viewpoint of rate of reaction. However, when a carbon material having a particle size of less than 100μ is employed, the fluorination reaction of a carbon material for the formation of a graphite fluoride, whether $(CF)_n$ or $(C_2F)_n$, is unavoidably accompanied by decomposition of the desired product with explosion, even if the carbon material is not stirred. If the carbon material having a particle size of less than 100μ is moved in the reaction system, for example, by stirring or vibrating, the decomposition with explosion (like dust explosion) is more likely to occur in the reaction system. Moreover, when the carbon material having a particle size of less than 100μ is reacted with fluorine in a stationary state, the thickness of the carbon material to be placed in the reaction vessel is extremely limited to, for example, only about 1 cm because if the thickness of the carbon material is more than about 1 cm the desired reaction does not proceed to the depth of the bed of the carbon material, leaving the carbon material at the lower portion of the bed unreacted. In order for the reaction to proceed to the lower portion of the carbon material bed completely, stirring or vibration of the reaction system is usually conducted. However, such stirring or vibration disadvantageously leads to decomposition of the product with explosion. In any event, with a carbon material having such a particle size of less than 100μ, advantageous production of a graphite fluoride cannot be attained.

The present inventors have made extensive and intensive studies with respect to fluorination of carbon materials with a view to developing a process which is useful for the production of a graphite fluoride on a commercial scale production, without the drawbacks accompanied by the conventional processes. It has been found that when a carbon material having an average size of 100μ to 10 mm is employed in the production of a graphite fluoride, the fluorination reaction can proceed to the entire depth of the carbon material bed completely even if the carbon material to be fluorinated is placed in a stationary state at a thickness of several centimeters to about several ten centimeters in a reaction vessel. In this connection, it is noted that even by the use of a carbon material having an average size of 100μ to 10 mm, the fluorination reaction of the carbon material is occasionally accompanied by decomposition of the product with explosion when the carbon material is vigorously stirred or vibrated. With a view to avoiding such decomposition of the product with explosion completely and to developing a process for producing a graphite fluoride in which the fluorination reaction stably proceeds without any occurrence of decomposition of the product with explosion and the desired graphite fluoride can be effectively obtained, the present inventors have made further studies. As a result, it has been found that the above purpose can be easily achieved by conducting the fluorination reaction using a carbon material of 100μ to 10 mm, terminating the fluorination reaction before completion thereof, and subjecting the resulting product to sifting with a sieve to remove the carbon material remaining unreacted from a desired graphite fluoride. Based on these novel findings, the present invention has been completed.

It is, therefore, an object of the present invention to provide a novel process for producing a graphite fluoride from a carbon material and fluorine safely and in high yield on an enlarged production scale.

The foregoing and other objects, features and advantages of the present invention will be apparent to those skilled in the art from the following detailed description and appended claims taken in connection with the accompanying drawing which shows a diagrammatic cross-sectional view of one form of a reaction vessel to be employed to practice the process of the present invention, which will be explained later with respect to Example 1.

According to the present invention, there is provided a process for producing a graphite fluoride, which comprises reacting a carbon material having an average size of 100μ to 10 mm with fluorine to form a graphite fluoride product.

Conventionally, it has been presumed that a carbon material to be used as a raw material for preparing a graphite fluoride should be powdery and have a size as small as less than 100μ. A carbon material having a large average size as used in the present invention is less reactive and, therefore, it has not been considered to use such a large-size carbon material as a raw material for producing a graphite fluoride. The use of such a large-size carbon material is contrary to common knowledge in the art. In fact, there has not been any report disclosing the use of a carbon material having such a large average size for producing a graphite fluoride on a commercial scale. Heretofore, fluorination of a carbon material has, been usually effected using a carbon material having a particle size of about 10 to 50μ under extremely severe conditions with the greatest care. If fluorination of a carbon material in a stirred or vibrated state is effected using as the carbon material a fine particulate carbon having a size less than 100μ, as described before, the decomposition of the product with explosion is often liable to occur during the reaction, thereby causing continuation of the operation to be impossible. The decomposition occurs even at lower temperatures than the thermal decomposition temperature of the graphite fluoride. Such a decomposition, a kind of dust explosion, occurs without any presage and, therefore, is extremely difficult to prevent.

According to the present invention, the decomposition can be well prevented by using a carbon material having an average size more than 100μ. In addition, the use of such a large-size carbon material advantageously enables the fluoride gas to be readily diffused through the gaps between the carbon grains so that a carbon material can be placed at an increased thickness or in an increased quantity in a reaction vessel, as compared with a fine particulate carbon material. A carbon material having an average size larger than 10 mm, however, is unfavorable, because the reaction rate markedly drops, leading to poor productivity.

In general, the greater the size of the carbon material, the greater the decrease of the reactivity thereof. Namely, the time required for complete fluorination becomes longer with the increase of the size of the carbon material. Further, as stated before, even if a carbon material having a large average size is used, sudden decomposition or explosion (like dust explosion)occasionally occurs with the progress of the fluorination reaction. This brings about a technical dilemma for the reaction with respect to the reaction rate, stability of reaction, yield and safety. In the efforts by the present inventors for resolving such a technical dilemma, it has been found that a graphite fluoride formed by fluorination of a carbon material is surprisingly very brittle and the graphite fluoride product formed over a carbon material remaining unreacted, therefore, can be efficiently separated from the unreacted carbon material simply by using a sieve. The mesh of a sieve to be used is somewhat dependent on the size of the carbon material employed, but is usually in the range of from 150 to 400 mesh, preferably 200 to 300 mesh in terms of Tyler mesh. The material of the sieve is not critical, if it is non-corrosive to fluorine. As the suitable material of the sieve, there can be mentioned stainless steel, brass, bronze and nickel. Too large a mesh is unfavorable because of decreased efficiency in separation, and too small a mesh is also unfavorable due to decreased recovery of the intended product. The separation efficiency and recovery in sifting with a sieve may be improved by placing soft balls or blocks made of rubber or the like in the sieve. The use of hard balls or blocks made of metal or the like is not preferred because not only lowered is the separation efficiency but also a damage of the sieve is caused. After the sifting operation, the separated unreacted carbon material may be reutilized as a raw material for the fluorination reaction to produce a graphite fluoride.

In the process of the present invention, any carbon material having an average size of 100μ to 10 mm, preferably 100μ to 1 mm, may be used regardless of the state of the material with respect to crystallinity. Namely, either crystalline or amorphous carbon materials may be used in the process of the present invention. As the suitable carbon material, there can be mentioned, for example, an artificial graphite, natural graphite, petroleum coke, pitch coke, activated carbon, carbon black and fibrous carbon. The above carbon materials are available on the market. For example, petroleum cokes (amorphous carbon) with varied particle or grain diameters may be produced by expelling volatile components from raw petroleum oil, polymerizing the resulting oil to give raw coke, heating the resulting raw coke in a rotary kiln or Riedhammer calcinating furnace at about 1400° C. to obtain calcined coke and grinding the obtained calcined coke to a predetermined size. Further, artificial graphites (crystalline carbon) may be produced by graphitizing the above-obtained coke at about 2400°–3000° C.

In the process of the present invention, fluorine gas produced by electrolysis of a KF-2HF molten salt may either be used as such or used after removing HF which is contained as an impurity. Of course, fluorine gas from a commercially available fluorine gas bomb may also be conveniently utilized. The fluorination reaction in the process of the present invention may be effected in an atmosphere of either fluorine gas alone or a mixture of fluorine gas and a diluent gas under an F2 pressure of 100 to 760 mm Hg. Usually, the fluorination reaction is effected under a pressure of 760 mm Hg. As the suitable diluent gas, there can be mentioned nitrogen gas, argon gas, neon gas, air, perfluorinated hydrocarbon gas and carbon dioxide gas.

As mentioned hereinbefore, the composition of a graphite fluoride to be formed by the fluorination of a carbon material varies depending on the reaction temperature and the kind or crystallinity of the raw carbon material. $(CF)_n$ may be produced by reacting an amorphous carbon material, such as petroleum coke, with fluorine at a temperature of about 200° C. to about 450° C. or by reacting a crystalline carbon material, such as natural and artificial graphites, with fluorine at a temperature of about 500° C. to about 630° C. The reason for conducting the fluorination reaction below 630° C. is that the decomposition of $(CF)_n$ is promoted over 630° C. and that there is not available a material for the reaction vessel which can withstand fluorine corrosion at such high temperatures. Compounds of $(CF)_n$ are produced with varied crystallinities and those having high crystallinities are white solids. On the other hand, $(C_2F)_n$ or $(C_2F)_n$-rich mixtures of $(C_2F)_n$ and $(CF)_n$ may be produced by reacting a crystalline carbon material, such as natural and artificial graphites, with fluorine at a temperature of about 300° C. to about 500° C. The color of $(C_2F)_n$ is black under the conditions for the formation thereof and changes from black through grey to white with heat treatment thereof at elevated temperature of up to about 600° C. with increase of crystallinity. When a natural graphite is used as a raw material, the resulting graphite fluoride product is $(CF)_n$-rich in the event the fluorination is conducted at a temperature higher than about 500° C., whereas it is $(C_2F)_n$-rich in the event the fluorination is conducted at a temperature up to about 500° C. The higher the temperature, the more the $(CF)_n$ content of the product, whereas the lower the temperature the more the $(C_2F)_n$ content of the product. The same also applies, with respect to an artificial graphite material except that the boundary temperature is not about 500° C. but 470° C.

The reaction time is not critical. If complete fluorination of a carbon material is intended, the fluorination reaction may be continued until weight increase of the graphite fluoride product is no longer recognized. However, in this case, there still occasionally occurs an sudden decomposition or explosion especially when the fluorination reaction is conducted while stirring or vibrating, as mentioned before. Therefore, in order to ensure stable fluorination reaction of a carbon material for obtaining a graphite fluoride product safely and in high yield without occurrence any decomposition of the product with explosion, it is more preferred to terminate the fluorination reaction of a carbon material at an appropriate time before completion thereof and subject the formed graphite fluoride product containing unreacted carbon material to sifting with a sieve, thereby to recover a desired graphite product from the unreacted carbon. It is also essential to use as a raw carbon material a carbon material having an average size of $100\mu$ to 10 mm in order to ensure efficient sifting with a sieve. If a small particulate carbon material is used, efficient sifting of the formed graphite fluoride product cannot be attained.

As described according to the present invention, the use of a carbon material having an average size of $100\mu$ to 10 mm is very effective in preventing sudden decomposition with explosion, increasing the amount of charged material and ensuring efficient sifting with a sieve. Further, the sifting can be very useful because formed graphite fluoride is very brittle and, therefore, the graphite fluoride and the carbon material remaining unreacted can be readily separated by sifting. Thus, the process of the present invention has a great advantage that a graphite fluoride can be stably, safely produced in high yield on a commercial scale.

The present invention will be illustrated in more detail with reference to the following Examples.

EXAMPLE 1

For preparing a graphite fluoride according to the process of the present invention, there was used an apparatus specially designed so that it may be resistant to a corrosive fluorine atmosphere. The apparatus is diagrammatically shown in the drawing. In the drawing, numeral 1 designates a nickel reaction vessel having a diameter of 210 mm and a height of 300 mm, numeral 2 a heater, numeral 3 a flow meter, numeral 4 a helical ribbon stirrer having a blade diameter of 200 mm, a width of 20 mm and a pitch of 200 mm, numeral 5 a moter, numeral 6 a gas charge valve, numeral 7 a gas discharge valve, numeral 8 a thermocouple, numeral 9 a safety valve and numeral 10 a pressure gauge. The stirring during the fluorination reaction was effected at a revolution speed of 4 rpm. 500 g of an artificial graphite having an average size of $400\mu$ (size distribution: $150\mu$ to $990\mu$) was placed in the reaction vessel, and evuated to vacuum. Nitrogen gas and then fluorine gas were led into the reaction vessel until the partial pressures thereof reached 200 mm Hg and 560 mm Hg, respectively.

Fluorine gas was generated by electrolysis of a KF-2HF molten salt, passed through NaF to remove hydrogen fluoride and introduced through a buffer tank into the reaction vessel.

Subsequently, the reaction system was heated at a temperature elevation rate of 2.5° C./min while stirring at 4 rpm. There was observed the initiation of a fluorination reaction at 330° C. After the start of the fluorination reaction, feeding of fluorine gas was re-initiated through the buffer tank. It was observed that the fluorine absorption rate increased to 12 g/hour at 340° C. Thereafter, the reaction temperature was controlled to maintain this absorption rate. Finally the temperature reached 400° C. The reaction system was further heated at 400° C. for 5 hours. In total, the heating was conducted for 50 hours.

There was produced 947 g of a graphite fluoride product. The calculation based on the weight difference between the product and the raw carbon material gave an empirical formula of $CF_{0.56}$, which was well in agreement with the analysis data obtained as follows.

A graphite fluoride sample was molten using a melting agent composition of sodium carbonate and potassium carbonate at 700°–750° C., and the molten mixture was dissolved in water. A portion of the sample solution was taken out, adjusted to pH 3.4, and titrated with thorium nitrate using Alizarin Red S as indicator. When the color change occurred, the titration was stopped, and the fluorine content of the Sample was calculated. An auto-photometric titrator was used for the titration.

The above-mentioned agreement between the two values proves that there occurred no decomposition reactions.

A sample of the obtained graphite fluoride product was examined by X-ray diffractometry using the Shimadzu X-ray Diffractometer XD-5 (manufactured and sold by Shimadzu Seisakusho, Japan) to give a powder X-ray diffraction pattern on which there were observed diffraction lines of 10.5° ($2\theta$) indicating the presence of $(C_2F)_n$ and 26.5° ($2\theta$) indicating the presence of unreacted graphite.

Therefore, the product was subjected to sifting. The sifting was conducted using the Analysette 3 (trade name of an electromagnetic vibration sieve machine manufactured and sold by Alfred Fritsch, West Germany) for one hour. There were provided 60-, 150-, 250-and 400-mesh sieves successively in the machine, and 20 rubber balls of 10 mm in diameter were put in the machine to improve separation efficiency. After completion of the sifting, each classified product was subjected to X-ray diffraction as mentioned above and the results are shown in Table 1. From the results, it was found that the classified products having an average size larger than 150 mesh (104μ) exhibit strong peaks of a diffraction line ascribed to unreacted graphite but those smaller than 150 mesh exhibit extremely weak or no peaks of said diffraction. Therefore, it was possible to obtain a graphite fluoride containing little unreacted graphite using a sieve of 150 mesh.

TABLE 1

| Grade of Sieve (mesh) | Diameter of Classified Product (μ) | Recovery of Classified Product (%) | Peak Height of X-ray Diffraction Line ascribed to Unreacted Graphite (cm) |
|---|---|---|---|
| −60 | 246– | 27.2 | 8.5 |
| 60–150 | 104–246 | 23.2 | 2.5 |
| 150–250 | 63–104 | 3.8 | 0.9 |
| 250–400 | 37–63 | 33.9 | 0.3 |
| 400– | –37 | 11.9 | 0 |

X-ray diffractometry conditions:
40 kV, 20 mA, 10 kcps

COMPARATIVE EXAMPLE 1

In the same reaction vessel as used in Example 1 was charged 500 g of an artificial graphite having an average size of 10μ (size distribution:, 1μ to 50μ), and evacuated to vacuum. Then, nitrogen gas and fluorine gas were introduced in the reaction vessel up to 200 mm Hg and 560 mm Hg, respectively. The reaction system was heated at a temperature elevation rate of 2.5° C./min. There was observed the initiation of a fluorination reaction at about 320° C. At 330° C. when the fluorine absorption rate reached 6 g/hour, there suddenly occurred a decomposition, causing a sudden drop in fluorine pressure. Therefore, the gases in the reaction vessel were replaced to give a fluorine concentration of 60%, and fluorination was attempted again. Fluorination reaction was conducted at 335° C. and at a fluorine absorption rate of 10 g/hour. One hour later, however, there occurred a decomposition again and a safety valve was automatically actuated, thereby causing any further reaction not to proceed.

Further, the fluorination was attempted several times, but there occurred a sudden decomposition at each time, thereby causing any further reaction not to proceed.

EXAMPLE 2

In the same reaction vessel as used in Example 1 was charged 500 g of a petroleum coke having an average size of 6 mm (size distribution: 0.99 mm to 10 mm). The fluorination reaction was effected in substantially the same manner as in Example 1. The fluorination reaction started at 250° C., and the reaction temperature was controlled to maintain a fluorine absorption rate at 12 g/hour. The reaction temperature was elevated to 310° C. In total, the heating was effected for 70 hours. There was produced 1.26 kg of a graphite fluoride product, and a calculation based on the weight difference between the product and the raw carbon material gave an empirical formula of $CF_{0.96}$, which was well in agreement with the analysis data obtained in the same manner as in Example 1. Therefore, it was confirmed that no decomposition occurred.

The product was a mixture of white fine powders of graphite fluoride and black grains of unreacted petroleum coke. Thus, the product was sifted through a standard sieve of 400 mesh by means of a vibration sieve machine. White powders which amounted to 95% of the total weight passed through the 400 mesh sieve, while the black unreacted carbon did not pass through the sieve and remained on the sieve. By this way, a complete separation of the produced graphite fluoride from the unreacted carbon was attained.

COMPARATIVE EXAMPLE 2

In the same reaction vessel as used in Example 1 was charged 500 g of an artifical graphite having an average size of 30 mm (size distribution: 10 mm to 50 mm). The fluorine absorption rate was only 1 g/hour or less even at a temperature of 400° C. The heating was effected for 150 hours but there was obtained only 612 g of a product. Namely, the weight increase was only 112 g as compared with 447 g as obtained in Example 1.

EXAMPLE 3

In the same reaction vessel as used in Example 1 was charged 500 g of an artifical graphite having an average size of 5 mm (size distribution: 0.99 mm to 10 mm). The fluorination reaction was conducted in substantially the same manner as in Example 1 except that a diluent gas was not used and $F_2$ pressure was 760 mm Hg. The fluorination reaction started at 340° C., and the reaction temperature was controlled to maintain a fluorine absorption rate at 10 g/hour. The temperature was elevated up to 450° C. In total, the heating was effected for 120 hours.

There was produced 905 g of a graphite fluoride product. A calculation based on the weight increase between the product and the raw carbon material gave an empirical formula of $CF_{0.51}$ which substantially agreed with an analytically found $CF_{0.52}$. Therefore, it was confirmed that no decomposition occurred.

In the X-ray diffraction pattern, there was observed a diffraction line at 26.5° ($2\theta$) ascribed to unreacted graphite in addition to a diffraction line at 12.0° ($2\theta$) ascribed to a graphite fluoride. The height of the peak of the diffraction line ascribed to unreacted graphite was as high as 25.2 cm.

The product was sifted through a standard sieve of 150 mesh by means of a vibration sieve machine. Fine particles which amounted to 45% of the total weight passed through the 150 mesh sieve. The graphite fluoride product obtained by the sifting was again subjected to X-ray diffraction. The X-ray diffraction pattern of the product exhibited a peak height of 0.8 cm only at the diffraction line ascribed to unreacted graphite. Thus, there was obtained a graphite fluoride less contaminated with unreacted graphite. The empirical formula of the graphite fluoride was analytically found to be $CF_{0.70}$.

EXAMPLE 4

In the same reaction vessel as used in Example 1 was charged 500 g of a petroleum coke having an average size of 450$\mu$ (size distribution: 104 to 990$\mu$). The fluorination reaction was conducted in substantially the same manner as in Example 1. The fluorination reaction started at 220° C., and the reaction temperature was controlled to maintain a fluorine absorption rate at 12 g/hour. The temperature was elevated to 300° C. In total, the heating was effected for 60 hours.

There was produced 1.18 kg of a graphite fluoride product. A calculation based on the weight increase between the product and the raw carbon material gave an empirical formula of $CF_{0.86}$ which substantially agreed with an analytically found $CF_{0.87}$. Therefore, it was confirmed that no decomposition occurred.

The product was sifted through a standard sieve of 400 mesh by means of a vibration sieve machine. White fine particles of graphite fluoride which amounted to 91% of the total weight passed through the 400 mesh sieve. The white $(CF)_n$ type graphite fluoride which passed through the sieve was analytically found to have an empirical formula of $CF_{1.12}$.

EXAMPLE 5

There was employed a reaction vessel of substantially the same structure as depicted in Example 1 except the absence of any stirrer. In the reaction vessel was charged 1000 g of an artificial graphite having an average size of 400$\mu$ (size distribution: 150 to 990$\mu$). The thickness of the charged artificial graphite was 30 mm. The fluorination reaction was conducted without stirring.

The reaction vessel was evacuated to vacuum. Nitrogen gas and then fluorine gas were led into the reaction vessel until the partial pressures thereof reached 200 mm Hg and 560 mm Hg, respectively.

The reaction system was heated at a temperature elevation rate of 2.5° C./min. There was observed the initiation of a fluorination reaction at 330° C. After the start of the fluorination reaction feeding of fluorine gas was re-initiated through the buffer tank. It was observed that the fluorine absorption rate increased to 6 g/hour at 340° C. Thereafter, the reaction temperature was controlled to maintain this absorption rate. Finally the temperature reached 400° C. The reaction system was further heated at 400° C. for 10 hours. In total, the heating was conducted for 200 hours.

There was produced 2100 g of a graphite fluoride product. A calculation based on the weight increase gave an empirical formula of $CF_{0.69}$ which agreed with the analytically found value. Therefore, it was confirmed that no decomposition occurred.

Two samples were taken respectively from the upper portion and the lower portion of the product layer, and subjected to X-ray diffraction. Both the samples exhibited a diffraction line ascribed to a graphite fluoride at 10.4° ($2\theta$) but neither of them exhibited a diffraction line ascribed to unreacted graphite. This proves that the fluorination reaction was effected to the bottom of the material layer.

COMPARATIVE EXAMPLE 3

In the same reaction vessel as used in Example 5 was charged 420 g of an artificial graphite having an average size of 10$\mu$ (size distribution: 1$\mu$ to 50$\mu$). The thickness of the charged artificial graphite was 30 mm as in Example 5. The fluorination reaction was conducted without stirring.

The reaction vessel was evacuated to vacuum. Nitrogen gas and then fluorine gas were led into the reaction vessel until the partial pressures thereof reached 200 mm Hg and 560 mm Hg, respectively.

The reaction system was heated at a temperature elevation rate of 2.5° C./min. There was observed the initiation of a fluorination reaction at 320° C. After the start of the fluorination reaction, feeding of fluorine gas was re-initiated through the buffer tank. It was observed that the fluorine absorption rate increased to 4 g/hour at 340° C. Thereafter, the reaction temperature was controlled to maintain this absorption rate. Finally the temperature reached 400° C. The reaction system was further heated at 400° C. for 150 hours. In total, the heating was conducted for 200 hours.

There was obtained 750 g of a graphite fluoride product. Two samples were taken respectively from the upper portion and the lower portion of the product layer, and subjected to X-ray diffraction. The sample from the lower portion exhibited a diffraction line ascribed to unreacted graphite at 26.5° ($2\theta$) in addition to that ascribed to a graphite fluoride. This evidences that there still remained unreacted graphite at the lower portion of the product layer.

What is claimed is:
1. A process for producing a graphite fluoride, which comprises the steps of:
   (1) reacting a carbon material having an average size of 100 $\mu$m to 10 mm with fluorine;
   (2) terminating the reaction prior to full completion thereof to form a graphite fluoride product comprised of a graphite fluoride and an unreacted carbon material, said graphite fluoride being brittle and present over the unreacted carbon material; and (3) subjecting the graphite fluoride product to sifting with a sieve of 150 to 400 mesh (Tyler) while applying impact to the graphite fluoride product by means of soft balls or blocks to recover the graphite fluoride from the unreacted carbon material.

2. A process according to claim 1, wherein said soft balls or blocks are rubber balls or blocks.

3. A process according to claim 1, wherein said carbon material is reacted with fluorine in an atmosphere of fluorine gas or a mixture of fluorine gas and a diluent gas under an $F_2$ pressure of 100 to 760 mm Hg.

4. A process according to claim 3, wherein said diluent gas is a member selected from the group consisting of nitrogen gas, argon gas, neon gas, air, perfluorinated hydrocarbon gas and carbon dioxide gas.

5. A process according to claim 1, wherein said carbon material is reacted with fluorine at a temperature of 200° to 600° C.

6. A process according to claim 1, wherein said carbon material is reacted with fluorine while stirring and oscillating.

7. A process according to claim 1, wherein said carbon material is a member selected from the group consisting of artificial graphite, natural graphite, petroleum coke, pitch coke, activated carbon, carbon black and fibrous carbon.

* * * * *